(12) United States Patent
McAllister et al.

(10) Patent No.: US 6,304,416 B1
(45) Date of Patent: Oct. 16, 2001

(54) TWO AXIS READING OF MEMORY CHIP IN CARTRIDGE

(75) Inventors: Jeffrey S. McAllister, Boise, ID (US); Thomas R. Albrecht, San Jose, CA (US)

(73) Assignee: Hewlett-Packard Co., Palo Alto, CA (US)

( * ) Notice: Subject to any disclaimer, the term of this patent is extended or adjusted under 35 U.S.C. 154(b) by 0 days.

(21) Appl. No.: 09/045,548

(22) Filed: Mar. 20, 1998

(51) Int. Cl.[7] .................................................. G11B 23/04
(52) U.S. Cl. .............................................................. 360/132
(58) Field of Search ................................................. 360/132

(56) References Cited

U.S. PATENT DOCUMENTS

| | | | |
|---|---|---|---|
| 5,055,947 | * 10/1991 | Satoh | 360/132 |
| 5,218,342 | 6/1993 | McCrackin | 340/572 |
| 6,065,701 | * 5/2000 | Tanimura et al. | 360/132 |

FOREIGN PATENT DOCUMENTS

| | | |
|---|---|---|
| 0841663A | 5/1998 | (EP) . |
| WO8910615A | 11/1989 | (WO) . |
| WO9300680A | 1/1993 | (WO) . |
| WO9310536A | 5/1993 | (WO) . |
| WO 94 02912 | 2/1994 | (WO) . |

OTHER PUBLICATIONS

EP 0669618A, Aug. 30, 1995, Sony Corp.
Patent Abstracts Of Japan, Aug. 11, 1998, Sony Corp.
EP Search Report, Sep. 30, 1999, EP 99 30 2045, 2 pages.

* cited by examiner

*Primary Examiner*—Robert S. Tupper

(57) ABSTRACT

A system and method provide information from a tape cartridge in two axes of the tape cartridge. A memory device is attached to the tape cartridge. At least one data transmitting antenna is provided in communication with the memory device. The data transmitting antenna is mounted to the tape cartridge at an angle to effectively transmit data to two axes of the tape cartridge. The data is transmitted using magnetic fields. Power is supplied to the memory device and the data transmitting antenna using magnetic fields.

23 Claims, 2 Drawing Sheets

TWO AXIS READING OF MEMORY CHIP IN CARTRIDGE

FIELD OF THE INVENTION

This invention relates in general to a device that uses contactless communication technology by means of a magnetic field transmission and, more particularly, to a memory device and antenna attached to a tape cartridge that transmits data in two axes of the tape cartridge.

BACKGROUND OF THE INVENTION

Many tape cartridges include an integrated circuit memory chip. Information stored on the memory chip is more readily accessed than information stored on the tape in the cartridge. It is therefore useful to store information concerning the tape cartridge and the contents of the tape on the memory chip. Information concerning the tape cartridge and the contents of the tape are then readily determined by reading the contents of the memory chip without reading the contents of the tape.

Conventionally the memory chip is mounted inside the tape cartridge. Electrical conductors are connected to the memory chip and pass through the outer wall of the tape cartridge. The conductors typically pass through the bottom surface of the tape cartridge. Alternatively, the conductors pass through the top surface or one of the side surfaces of the tape cartridge.

A device for reading the memory chip contacts the electrical conductors from outside the tape cartridge. Typically the memory chip reading device is mounted inside a tape drive. A tape cartridge is inserted front surface first into the tape drive. The memory chip reading device in the tape drive contacts the conductors passing through the outer surface of the tape cartridge. The memory chip reading device supplies power to the memory chip and reads the contents of the memory chip through the conductors. Then the memory chip reading device provides information from the memory chip to the tape drive.

It is also desirable to read information from the memory chip while the tape cartridge is stored in a tape cartridge library. Tape cartridges stored in tape cartridge libraries are most easily accessed by a library picker from the back surface of the tape cartridge. Since a tape cartridge is inserted front first into a tape drive, the back surface of the tape cartridge is not readily accessible by a memory chip reader mounted inside the tape drive.

Noncontact interfaces have been used in integrated circuit computer cards. These interfaces use magnetic fields to provide communication and power supply between two antennas. A first antenna supplies a magnetic field which is received by the second antenna. The second antenna converts the magnetic field into power for the integrated circuit. The second antenna then transmits data from the integrated circuit to the first antenna using magnetic fields.

SUMMARY OF THE INVENTION

According to principles of the present invention in a preferred embodiment, a system and method transmit information from a tape cartridge in two axes of the tape cartridge. A memory device is attached to the tape cartridge. The memory device stores information concerning the tape cartridge and the contents of the tape in the cartridge. At least one data transmitting antenna is provided in communication with the memory device. The data transmitting antenna is mounted to the tape cartridge at an angle to effectively transmit data to two axes of the tape cartridge. The data is transmitted using magnetic fields. Power is supplied to the memory device and the data transmitting antenna using magnetic fields.

According to further principles of the present invention, the data transmitting antenna is oriented at about a 45° angle from each of two axes of the tape cartridge. One axis of the tape cartridge is represented by a bottom surface of the tape cartridge. Another axis of the tape cartridge is represented by a back surface of the tape cartridge. Data receiving antennas positioned adjacent the back and bottom surfaces of the tape cartridge receive data transmitted from the data transmitting antenna.

DETAILED DESCRIPTION OF THE INVENTION

Figure 1:
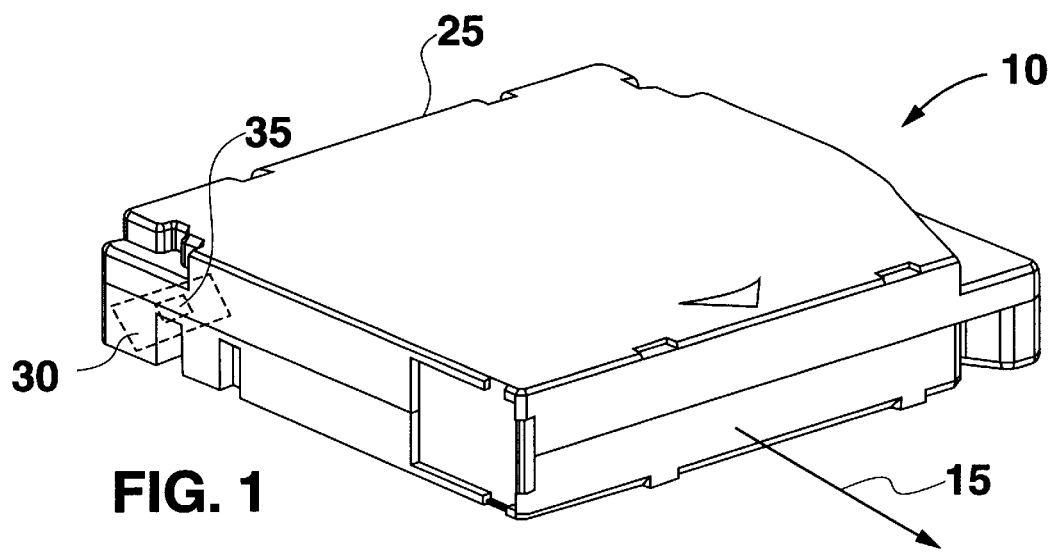
FIG. 1 is a front perspective of a tape cartridge of the present invention.
Figure 2:
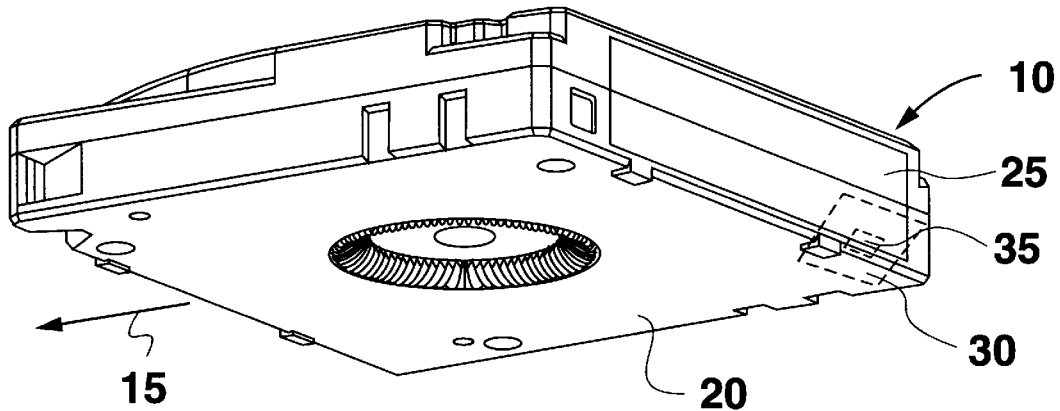
FIG. 2 is a rear perspective of the tape cartridge in FIG. 1.

FIGS. 1 and 2 illustrate a tape cartridge 10 of the present invention. Although tape cartridge 10 may be oriented at any angle, for purposes of clarity the surfaces of tape 10 are designated as they would be in a typical application. Typically tape cartridge 10 is inserted into a tape drive (not shown) in direction 15. Tape cartridge 10 has multiple axes. One axis of tape cartridge 10 is defined by a bottom surface 20 of tape cartridge 10. Another axis of tape cartridge 10 is defined by a back surface 25 of tape cartridge 10. Only the axes defined by bottom surface 20 and back surface 25 will be discussed. However, an axis of tape cartridge 10 may be represented by any surface of tape cartridge 10.

Data transmitting antenna 30 is mounted inside tape cartridge 10 near bottom surface 20 and back surface 25. Alternatively, data transmitting antenna 30 is mounted anywhere inside tape cartridge 10 where it does not interfere with the tape inside tape cartridge 10. Data transmitting antenna 30 is preferably mounted at about a 45° angle relative to bottom surface 20 and back surface 25. A 45° angle evenly distributes signal strength from data transmitting antenna 30 between bottom surface 20 and back surface 25. Alternatively, data transmitting antenna 30 is mounted at an angle to effectively transmit to both bottom surface 20 and back surface 25.

Memory device 35 is preferably mounted on a common substrate with antenna 30. Alternatively, memory device 35 is mounted separate from antenna 30 and communicates with antenna 30 through electrical conductors. Memory device 35 stores information related to tape cartridge 10 or its contents. Memory device 35 may be a conventional memory chip. Alternatively, memory device 35 is any device for storing information which may be retrieved electronically.

Figure 3:
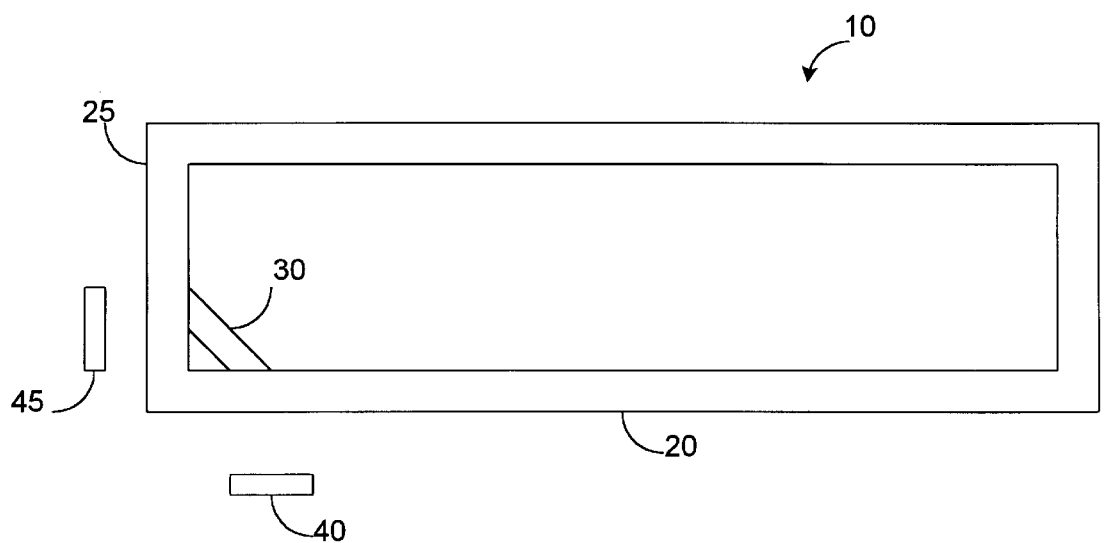
FIG. 3 is a side elevation section of the tape cartridge and two data receiving antennas.

Referring to FIG. 3, a side section view of tape cartridge 10 shows data transmitting antenna 30 at about a 45° angle. Adjacent bottom surface 20 of tape cartridge 10 and receiving data transmitting antenna 30 is a first data receiving antenna 40. First data receiving antenna 45 is a data receiving antenna for any device for reading the contents of memory device 35 from bottom surface 20. A tape drive is a typical device for reading the contents of memory device 35 from bottom surface 20. A data receiving antenna 40 for a tape drive is typically mounted inside the tape drive.

Additionally, a second data receiving antenna 45 is shown adjacent data transmitting antenna 30 and back surface 25 of tape cartridge 10. Second data receiving antenna 45 is a data receiving antenna for any device for reading the contents of memory device 35 from back surface 25. Devices for reading the contents of memory device 35 from back surface 25 include a library picker and a hand held reading device. A library picker is used to select tape cartridges from a tape cartridge library. It is noted that although FIG. 3 shows both first data receiving antenna 40 and second data receiving antenna 45 simultaneously adjacent data transmitting antenna 30, in use only one data receiving antenna 40, 45 is likely to be adjacent data transmitting antenna 30 at a time.

Data transmitting antenna 30 is powered using magnetic fields emanating from either first data receiving antenna 40 or second data receiving antenna 45. Data transmitting antenna 30 is preferably a coil antenna so that magnetic fields emanating from data receiving antenna 40, 45 are converted to power for data transmitting antenna 30 and memory device 35. Power supplied to data transmitting antenna 30 and memory device 35 allows data transmitting antenna 30 to transmit digital data from memory device 35 to adjacent data receiving antenna 40, 45.

Figure 4:
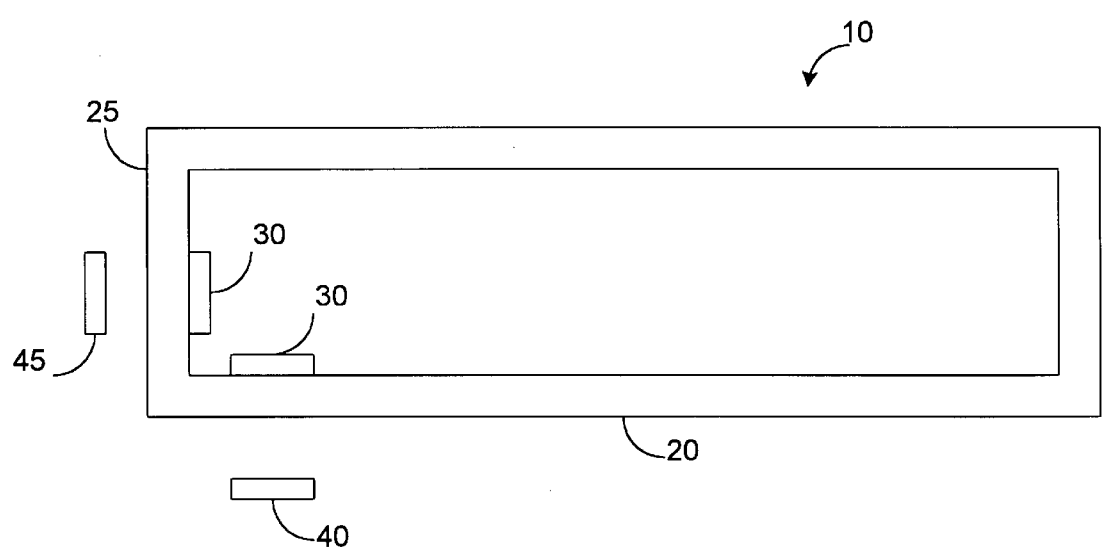
FIG. 4 is a side elevation section of an alternate embodiment of the tape cartridge of the present invention.

FIG. 4 shows an alternate embodiment of data transmitting antenna 30. Two data transmitting antennas 30 are mounted inside tape cartridge 10 and in communication with memory device 35. One data receiving antenna 30 is mounted parallel to and near bottom surface 20. The other data receiving antenna 30 is mounted parallel to and near back surface 25.

Data transmitting antenna 30 mounted parallel to bottom surface 20 transmits data to first data receiving antenna 40 when first data receiving antenna 40 is adjacent data transmitting antenna 30. Data transmitting antenna 30 mounted parallel to back surface 25 transmits data to second data receiving antenna 45 when second data receiving antenna 45 is adjacent data transmitting antenna 30.

What is claimed is:

1. A tape cartridge comprising:
   (a) an outer casing having a first surface and a second surface;
   (b) a tape within the outer casing;
   (c) a memory device mounted inside the outer casing; and,
   (d) at least one data transmitting antenna in communication with the memory device wherein the at least one data transmitting antenna transmits data from the memory device, encoded in magnetic fields, through the first surface and the second surface of the outer casing.

2. The tape cartridge of claim 1 wherein the at least one data transmitting antenna is angled to effectively transmit data through both the first surface and the second surface of the outer casing.

3. The tape cartridge of claim 1 wherein the at least one data transmitting antenna is mounted to the outer casing at about a 45 degree angle from the first surface of the outer casing.

4. The tape cartridge of claim 1 wherein at least one data transmitting antenna is mounted to the outer casing parallel to the first surface of the outer casing and at least one data transmitting antenna is mounted to the outer casing parallel to the second surface of the outer casing.

5. The tape cartridge of claim 1 wherein the at least one data transmitting antenna and the memory device are mounted on a common substrate.

6. The tape cartridge of claim 1 wherein the at least one data transmitting antenna is a coil antenna.

7. The tape cartridge of claim 1 wherein the first surface of the outer casing is perpendicular to the second surface of the outer casing.

8. A system for transmitting information from a tape cartridge in two axes of the tape cartridge, the tape cartridge having an outer casing, the surfaces of which define the axes of the tape cartridge, the system comprising:
   (a) a memory device within the tape cartridge;
   (b) at least one data transmitting antenna mounted within the tape cartridge at about a 45 degree angle from one axis of the tape cartridge and in communication with the memory device wherein the at least one data transmitting antenna transmits data, encoded in magnetic fields, from the memory device through the outer casing, in two axes of the tape cartridge.

9. The system of claim 8 wherein the at least one data transmitting antenna and the memory device are mounted on a common substrate.

10. The system of claim 8 wherein the at least one data transmitting antenna is a coil antenna.

11. The system of claim 8 wherein the data transmitting antenna further includes:
    (a) means for receiving magnetic fields; and,
    (b) means for converting the received magnetic fields to power.

12. A method for transmitting data from a tape cartridge in two axes of the tape cartridge, the tape cartridge having an outer casing, the surfaces of which define the axes of the tape cartridge, the method comprising:
    (a) mounting a memory device in the tape cartridge;
    (b) mounting at least one data transmitting antenna in the tape cartridge at about a 45 degree angle from one axis of the tape cartridge;
    (c) providing communication between the memory device and the at least one data transmitting antenna; and,
    (d) transmitting data from the memory device though the at least one data transmitting antenna and through the outer casing, in two axes of the tape cartridge.

13. The method of claim 12 wherein the at least one data transmitting antenna transmits data encoded in magnetic fields.

14. The method of claim 12 further including providing power to the data transmitting antenna through magnetic fields.

15. The method of claim 12 wherein mounting the at least one data transmitting antenna and mounting the memory device includes mounting the at least one data transmitting antenna and the memory device on a common substrate.

16. A system for transmitting information from a tape cartridge in two axes of the tape cartridge, the tape cartridge having an outer casing, the surfaces of which define the axes of the tape cartridge, the system comprising:
    (a) a memory device within the tape cartridge;
    (b) at least one data transmitting antenna mounted within the tape cartridge parallel to a first axis of the tape cartridge and at least one data transmitting antenna mounted within the tape cartridge parallel to a second axis of the tape cartridge, each data transmitting antenna in communication with the memory device wherein the data transmitting antennas transmit data, encoded in magnetic fields, from the memory device through the outer casing, in two axes of the tape cartridge.

17. The system of claim 16 wherein each data transmitting antenna and the memory device are mounted on a common substrate.

18. The system of claim 16 wherein each data transmitting antenna is a coil antenna.

19. The system of claim 16 wherein each data transmitting antenna further includes:

(a) means for receiving magnetic fields; and, (b) means for converting the received magnetic fields to power.

20. A method for transmitting data from a tape cartridge in two axes of the tape cartridge, the tape cartridge having an outer casing, the surfaces of which define the axes of the tape cartridge, the method comprising:

(a) mounting a memory device in the tape cartridge;

(b) mounting at least one data transmitting antenna within the tape cartridge parallel to a first axis of the tape cartridge and mounting at least one data transmitting antenna within the tape cartridge parallel to a second axis of the tape cartridge;

(c) providing communication between the memory device and each data transmitting antenna; and, (d) transmitting data from the memory device though the data transmitting antennas and through the outer casing, in two axes of the tape cartridge.

21. The method of claim 20 wherein each data transmitting antenna transmits data encoded in magnetic fields.

22. The method of claim 20 further including providing power to each data transmitting antenna through magnetic fields.

23. The method of claim 20 wherein mounting each data transmitting antenna and mounting the memory device includes mounting each data transmitting antenna and the memory device on a common substrate.

* * * * *